United States Patent [19]

Sjostrand

[11] Patent Number: 4,879,841
[45] Date of Patent: Nov. 14, 1989

[54] CONVEYOR

[75] Inventor: Jorgen Sjøstrand, Odense, Denmark

[73] Assignee: Bronnums Maskinfabrik A/S, Kerteminde, Denmark

[21] Appl. No.: 128,339

[22] PCT Filed: Apr. 3, 1987

[86] PCT No.: PCT/DK87/00034
§ 371 Date: Dec. 7, 1987
§ 102(e) Date: Dec. 7, 1987

[87] PCT Pub. No.: WO87/06094
PCT Pub. Date: Oct. 22, 1987

[30] Foreign Application Priority Data
Apr. 7, 1986 [DK] Denmark ............................. 1564/86

[51] Int. Cl.$^4$ .......................... A01G 9/14; A01G 31/02
[52] U.S. Cl. ............................................ 47/59; 47/65; 198/724; 198/778
[58] Field of Search .................... 47/59, 60, 61, 62, 63, 47/64, 65; 198/778, 724

[56] References Cited

U.S. PATENT DOCUMENTS

| | | |
|---|---|---|
| 2,222,310 | 11/1940 | Emery ................. 47/65 X |
| 3,983,989 | 10/1976 | Wahren ................. 198/778 |
| 4,166,341 | 9/1979 | Vestergaard ............ 47/59 |
| 4,258,501 | 3/1981 | Brown ................. 47/65 X |
| 4,617,755 | 10/1986 | Ikeda et al. ............ 47/65 |

Primary Examiner—Robert A. Hafer
Assistant Examiner—Sam Rimell
Attorney, Agent, or Firm—Cushman, Darby & Cushman

[57] ABSTRACT

A trough which spirals in several turns in a plane about a vertical central axis has an arrangement of rails superimposed on it so the rails radiate from the vertical central axis and divide the trough into cells. Potted plants are placed in the cells, initially near the center, with spacing between them along the spiral. As the plants grow, either the trough or the arrangement of rails, or both, is turned about the central axis, so that the rails, engaging the pots, propel the potted plants outwards along the spiral, thus giving the plants more room. The plants can be watered by introducing water into the trough.

8 Claims, 3 Drawing Sheets

CONVEYOR

BACKGROUND OF THE INVENTION

The invention relates to a circular transport system mainly for cultivating plants. The transport system, which is capable of advancing the plants while imparting to them an even, continuous distance during the process of growth, consists of two horizontal rotor bodies located about a common vertical axis as well as a plurality of transport baskets for the plants.

One of the rotor bodies is helical, whereas the other one has a plurality of radial guide rails, which forcibly conduit the plants, every one of which is located within its own basket, along the helical track from the centre to the periphery, with either one or both of the rotor bodies rotating. The transport systems for plant cultivation known today, in which, while imparting a distance during the process of growth, an attempt is made to make optimal use of the area, consist as a rule of channels in which the plants are placed at the mutual final distances of the plants. By moving these channels away from one another during the process of growth, the area is utilised, but only in one direction.

This method is further improved according to the U.S. Pat. No. 4,166,341, according to which the plants are shifted intermittently within the channels themselves by means of a string pull. In order to achieve better utilisation of the area when using the system, it is, however, necessary either to move parts of channels containing plants so as to extend other channels, or to move the plants from one channel to another, since, with the string pull, it is possible only to impart a certain distance with each pull of the string.

Besides, the system is very schematic and diagram-orientated, and it requires, in practice, a very high degree of automation or even many manual operations, which will obviously not be in proportion to the benefits.

SUMMARY OF THE INVENTION

The transport system according to the invention has the special feature that it can advance the plants during their process of growth, while increasing the distance evenly and continuously in several horizontal directions, inasmuch as the system consists of two horizontal rotor bodies capable of rotating separately or jointly about a common vertial axis so that the plants located, each in its own transport basket, are carried away from one another in the course of such rotation.

The transport system acts in such a way as to cause the transport baskets with plants to be carried from the centre towards the periphery, inasmuch as the helical rotor body conveys them in an outward direction at the same time that the rotor body with the radial guide rails ensures the required mutual distance between the transport baskets.

With the transport system of the present invention, one achieves, in particular, that, as the plants are advanced, subject to the distance between them being evenly and continuously increased, it is possible, on the one hand, to make good use of the plants' space requirement and, on the other hand, entirely to avoid manual displacements during the process of growth.

A simple embodiment of the assembled transport system according to the invention consists in that the helical body is located within a vessel in which water, with nutrient added, can circulate, or the level of water may be raised and lowered, entirely in accordance with the requirements of the plants.

Another embodiment may consist in designing the helical body in such a way as to ensure that it both forms a channel, or is equipped with such water supply devices, as to enable water to be supplied to the plants either in a continuous flow or subdivided into sections.

A third embodiment consists in that such water supply devices are provided along the radial guide rails, or when designing the guide rails themselves, which are able to ensure that the plants are supplied with the requisite amount of water.

A fourth embodiment consists in that the helical body and the transport baskets are provided with tooth-type devices so that the baskets are rotated about their own axes, inasmuch as the said devices actuate the transport baskets to cause such a rotation when the system is working.

In order to avoid excessive evaporation of water and dipping of the plant leaves into water the spaces between the radial guide rails should be covered, but this is only necessary if required by the conditions of cultivation of the plants.

DETAILED DESCRIPTION

Figure 1:
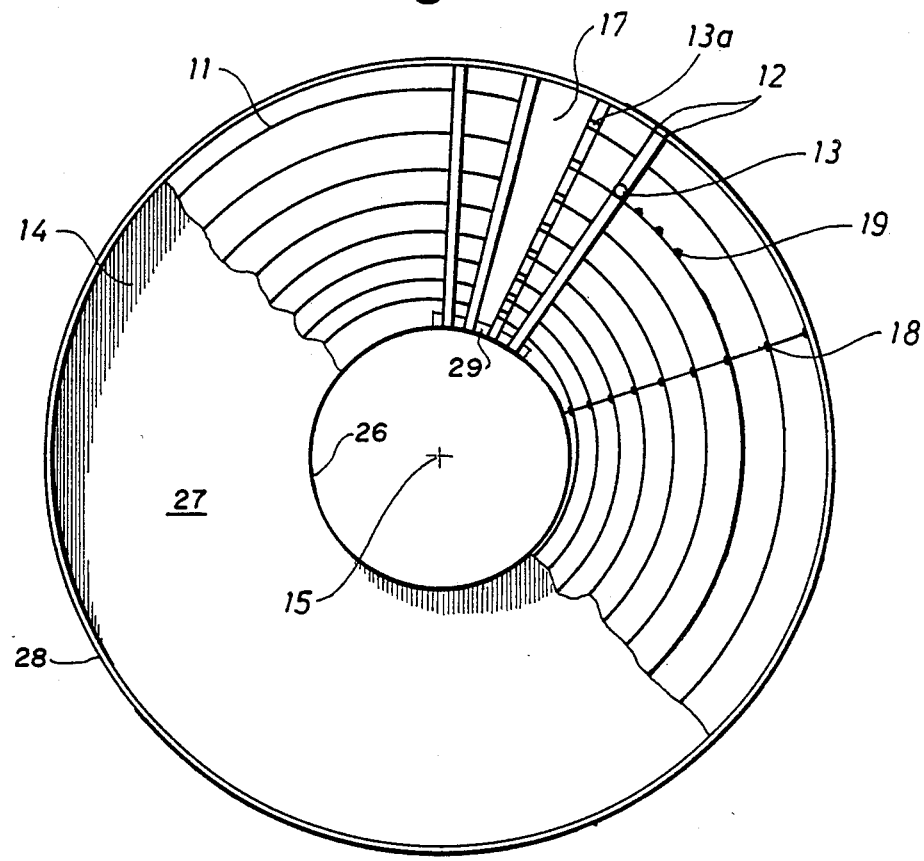
FIG. 1 is a top plan view of a circular transport system embodying principles of the present invention.
Figure 2:
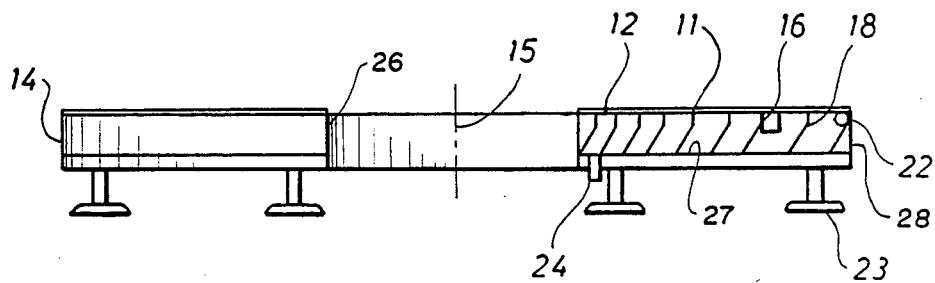
FIG. 2 is a side elevation view thereof, with a portion broken open and sectioned, so as to expose internal details.

As shown in FIGS. 1 and 2, the system 10 includes an upwardly open annular vessel 14 which is elevated on supports 23 so as to be rotatable about a central vertical axis 15. The vessel 14 has an inner peripheral wall 26, a bottom wall 27 and an outer peripheral wall 28.

Depending into the vessel, and mounted with respect thereto by holders 18 is a generally vertical, multiple-turn spiral wall 11, which spirals about the axis 15. Thus a spiral path is defined between adjacent turns, from adjacent the inner peripheral wall 26 to adjacent the outer peripheral wall 28.

Superimposed on the vessel 14 is an arrangement of horizontal radial guide rails 12, connected together, e.g. at 29, to be rotated as a unit about the central axis 15. Thus the guide rails 12 cooperate with the spiral wall 11 to divide the spiral path into cells.

In use, potted plants are started out along the path by setting them, in their pots 13 (round pots) or 13a (square pots), between adjacent turns of the spiral wall 11, in respective cells, near the inner peripheral wall 26.

If desired, alternate sectors of cells can be blanked-off by covers 17 and not used.

Water can be provided to the potted plants in several ways. Water can be introduced through inlets 22 provided along the spiral wall 11. Water 20a can be introduced through inlets 21 provided along the radial rails 12. An outlet for draining water from the vessel is shown at 24.

Figure 3:
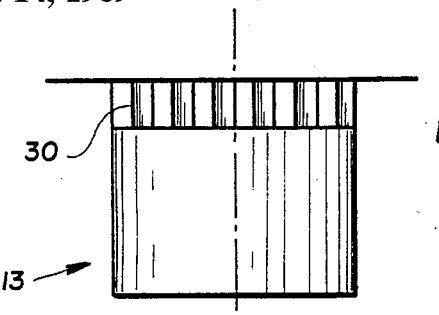
FIG. 3A is a side elevation view of a round transport basket for use on the system.
FIG. 3B is a top plan view thereof.
Figure 3A:
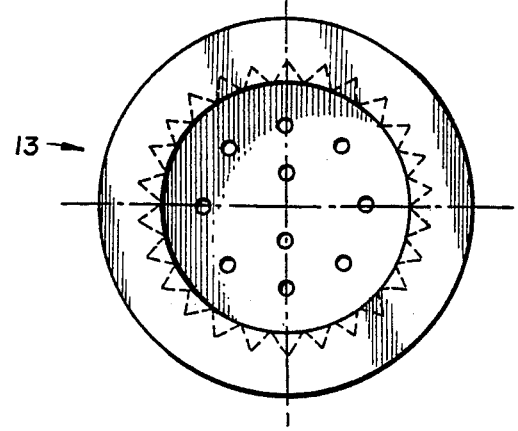
Figure 4:
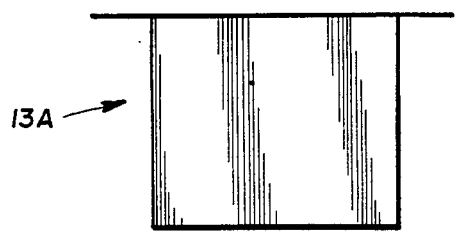
FIG. 4A is a side elevational view of a square transport basket for use on the system.
FIG. 4B is a top plan view thereof.
Figure 4A:
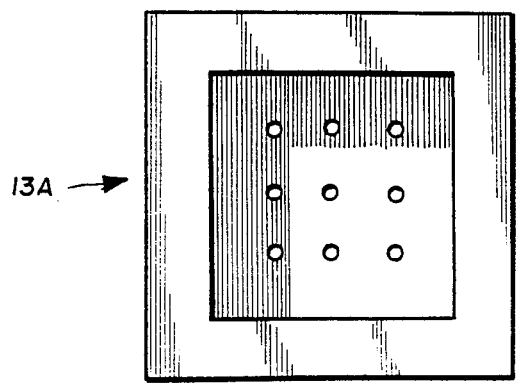

The pots 13, 13a (FIGS. 3-4A) are tall enough to be engaged by the radial rails 12.

A series of teeth 19 is provided on the spiral wall 11 at a level to engage teeth provided on the pot sidewalls.

In use, one, the other or both of the vessel 14 and the arrangement of radial guide rails is or are rotated about the axis 15 in a sense to advance the potted plants radially outwards along the path, while maintaining them spaced from one another, and permitted to grow. As the potted plants reach the end of the path, they are removed from the system 10.

Figure 5:
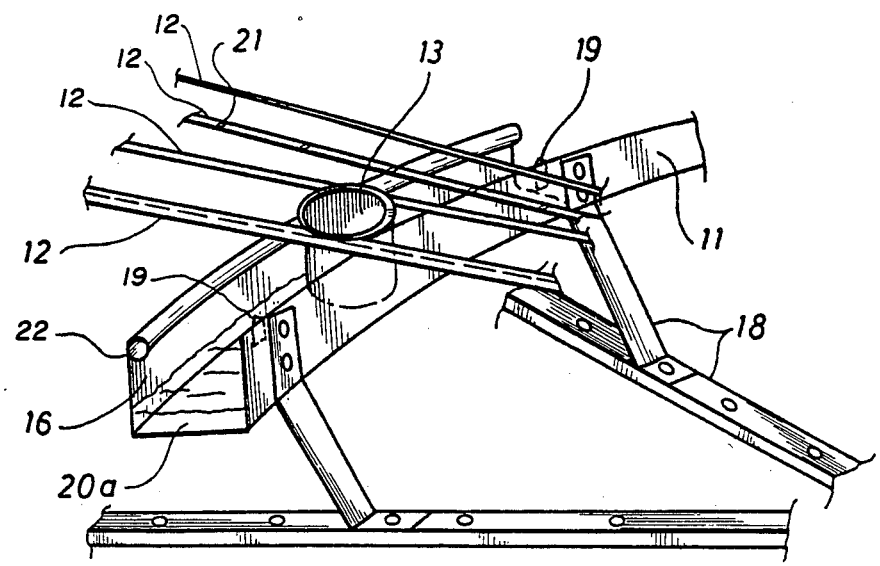
FIG. 5 is a framentary perspective view of the system, in use.

In the variation shown in FIG. 5, the vessel 14 and spiral wall are replaced by an upwardly open spiral trough 16 in a simple merger of the structures and functions of these elements. The remainder of the system remains as described in relation to FIGS. 1 and 2.

I claim:

1. A system for continually increasing spacing between potted plants as the potted plants grow larger, comprising:

upright wall means providing a horizontal path which spirals radially outwards about a vertical central axis;

an arrangement of radially directed, angularly spaced guide rails superimposed upon said upright wall means and centered upon said central axis;

said arrangement of guide rails thereby dividing said path into a plurality of cells arranged in sectors which are separated angularly from one another by intervening ones of said guide rails, each said sector of cells comprising a series of radially adjacent cells which are separated by respective turns of said wall means;

means associated with said upright wall means for supporting pots of potted plants with sidewalls of the pots in contact with said wall means and said guide rails when the pots are disposed in respective ones of said cells;

at least one of said upright wall means and said arrangement of guide rails being supported for rotation about said central axis, whereby, the plants in the pots can be provided with room to grow, by initially placing potted plants in at least some of the radially inner ones of said cells and, as the plants grow, rotating at least one of said upright wall means and said arrangement of guide rails in a sense to advance the potted plants in said radially inner ones of said cells radially outwards along said path.

2. The system of claim 1, wherein:

said upright wall means form corresponding portions of an upwardly open vessel further including bottom wall means, said vessel being constructed and arranged to hold water, whereby the plants in pots in the cells can receive water, at least in part, from water contained in the vessel.

3. The system of claim 2, further including:

means associated with said upright wall means for introducing water into said vessel.

4. The system of claim 2, further including:

means associated with said arrangement of guide rails for introducing water into said vessel.

5. The system of claim 2, further including:

means associated with said bottom wall means for draining water from said vessel.

6. The system of claim 1, wherein:

successive turns of said upright wall means, proceeding in a radially outward direction, are spaced further from one another.

7. The system of claim 1, further including:

tooth means provided on said upright wall means and positioned thereon for engagement with the pots of the potted plants received in said cells, for rotating the pots in the cells as said at least one of said upright wall means and said arrangement of guide rails is rotated about said central axis in a sense to rotate the potted plants as the potted plants advance the potted plants along said path.

8. The system of claim 1, further including:

cover plates covering some of said sectors of cells and thereby preempting use of such cells for receiving potted plants, whereby at least some of said sectors of said cells remain available to receive potted plants and are separated form one another by cover plate-covered ones of said sectors of cells.

* * * * *